(12) United States Patent
Matsuda (10) Patent No.: US 9,045,164 B2
(45) Date of Patent: Jun. 2, 2015

(54) VEHICLE BODY STRUCTURE

(75) Inventor: Hidenori Matsuda, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/360,341

(22) PCT Filed: Nov. 30, 2011

(86) PCT No.: PCT/JP2011/077704
§ 371 (c)(1),
(2), (4) Date: May 23, 2014

(87) PCT Pub. No.: WO2013/080340
PCT Pub. Date: Jun. 6, 2013

(65) Prior Publication Data
US 2014/0319874 A1  Oct. 30, 2014

(51) Int. Cl.
*B62D 25/00*   (2006.01)
*B62D 27/02*   (2006.01)
*B62D 25/20*   (2006.01)
*B62D 29/04*   (2006.01)

(52) U.S. Cl.
CPC .......... *B62D 27/023* (2013.01); *B62D 25/2036* (2013.01); *B62D 29/043* (2013.01); *B62D 29/048* (2013.01)

(58) Field of Classification Search
USPC ............. 296/193.06, 193.05, 193.07, 203.03, 296/187.12, 187.08
See application file for complete search history.

(56) References Cited

U.S. PATENT DOCUMENTS 5,046,778 A *   9/1991  Larsen ......................... 296/202
6,206,458 B1 *  3/2001  Schroeder et al. ....... 296/203.01
2007/0102964 A1 *  5/2007  Yoshimoto et al. ...... 296/187.12

FOREIGN PATENT DOCUMENTS

| JP | 05-185960 B2 | 7/1993 |
| JP | 2005-324653 A | 11/2005 |
| JP | 2008-260334 A | 10/2008 |
| JP | 2008-265416 A | 11/2008 |
| JP | 2011-088495 A | 5/2011 |

* cited by examiner

*Primary Examiner* — Joseph D Pape
(74) *Attorney, Agent, or Firm* — Kenyon & Kenyon LLP (57) ABSTRACT

A vehicle body structure includes a floor fabricated of resin, a pillar fabricated of resin, and a connecting member. The floor is disposed at a vehicle body lower side. The pillar is disposed so as to extend in a vehicle body up-and-down direction at a vehicle width direction outer side of the floor. The connecting member connects the pillar with the floor, and is constituted of a material with higher ductility than the pillar and the floor. Thus, a withstand load strength of a joining portion between the pillar and the floor is assured.

4 Claims, 9 Drawing Sheets

VEHICLE BODY STRUCTURE

CROSS-REFERENCE TO RELATED APPLICATIONS

This is a national phase application based on the PCT International Patent Application No. PCT/JP2011/077704 filed on Nov. 30, 2011, the entire contents of which are incorporated herein by reference.

TECHNICAL FIELD

The present invention relates to a vehicle body structure.

BACKGROUND ART

A vehicle body structure has been known since heretofore (for example, see Japanese Patent Application Laid-Open (JP-A) No. 2011-88495) in which a vehicle body is divided in two—a vehicle body upper body at the upper side relative to the middle of each pillar (which includes the roof) and a vehicle body lower body at the lower side (which includes the floor)—and the vehicle body upper body is constituted of a resin material and the vehicle body lower body is constituted of a metal material.

SUMMARY OF INVENTION

Technical Problem

Constituting the vehicle body lower body of this vehicle body structure with a resin material has been considered, in order to further reduce the weight of the vehicle. However, in this case there is an issue with assuring withstand load strength at joining portions between the vehicle body upper body and the vehicle body lower body, with respect to loads applied from the vehicle width direction outer sides at times of side collisions and the like.

In consideration of the situation described above, an object of the present invention is to provide a vehicle body structure that may assure the withstand load strength of joining portions between pillars fabricated of resin and a floor fabricated of resin.

Solution to Problem

To achieve the object described above, a vehicle body structure of a first aspect according to the present invention includes: a floor fabricated of resin that is disposed at a vehicle body lower side; a pillar fabricated of resin that is disposed so as to extend in a vehicle body up-and-down direction at a vehicle width direction outer side of the floor; and a connecting member that connects the pillar with the floor, the connecting member being constituted of a material with higher ductility than the pillar and the floor.

According to the first aspect, the connecting member that connects the resin pillar with the resin floor is constituted of a material with higher ductility than the pillar that is fabricated of resin and the floor that is fabricated of resin. Therefore, when a load is inputted from the vehicle width direction outer side during a side collision or the like, energy is absorbed by the connecting member and damage to the joining portion between the resin pillar and the resin floor is suppressed or prevented. Accordingly, the withstand load strength of the joining portion between the resin pillar and the resin floor (i.e., the connecting member) may be assured.

In a vehicle body structure of a second aspect according to the present invention, in the vehicle body structure of the first aspect, the connecting member is constituted of a metal material.

According to the second aspect, because the connecting member is fabricated of metal, a load inputted from the vehicle width direction outer side may be efficiently absorbed by the connecting member.

A vehicle body structure of a third aspect according to the present invention, in the vehicle body structure of the first aspect or the second aspect, further includes a tension member that is provided in a tensioned state between the pillar and the floor at a vehicle width direction outer side of the connecting member.

According to the third aspect, because the tension member is provided in the tensioned state between the pillar and the floor at the vehicle width direction outer side of the connecting member, deformation of the pillar to the vehicle width direction inner side may be suppressed by the tension member.

In a vehicle body structure of a fourth aspect according to the present invention, in the vehicle body structure of any one of the first to third aspects, a lower end portion side of the connecting member serves as a floor-fastening portion that extends to a vehicle width direction inner side and is fastened by a bolt to the floor, and the floor-fastening portion includes a weakened portion that is ruptured by the bolt when a load is inputted to the floor-fastening portion from a vehicle width direction outer side and the floor-fastening portion is pushed to a vehicle width direction inner side.

According to the fourth aspect, when a load is inputted from the vehicle width direction outer side and the floor-fastening portion is pushed to the vehicle width direction inner side, the weakened portion is ruptured by the bolt and the floor-fastening portion slides to the vehicle width direction inner side. Therefore, the load inputted from the vehicle width direction outer side may be efficiently absorbed.

In a vehicle body structure of a fifth aspect according to the present invention, in the vehicle body structure of the fourth aspect, the weakened portion is between a bolt insertion hole and a penetrating hole that is formed at a vehicle width direction outer side of the bolt insertion hole.

According to the fifth aspect, the weakened portion may be formed by the formation of the penetrating hole at the vehicle width direction outer side of the bolt insertion hole. Thus, the weakened portion may be formed with ease.

Advantageous Effects Of Invention

As described above, according to the present invention, the withstand load strength of joining portions between pillars fabricated of resin and a floor fabricated of resin may be assured.

DESCRIPTION OF EMBODIMENTS

Herebelow, an exemplary embodiment relating to the present invention is described in detail in accordance with the drawings. The arrow FR that is shown where appropriate in the drawings indicates the forward direction in a vehicle body front-and-rear direction, the arrow UP indicates the upward direction in the vehicle body up-and-down direction, and the arrow OUT indicates a vehicle width direction outer side. In the following descriptions, where the directions front, rear, up and down are used without being further specified, the same represent the front and rear in the vehicle body front-and-rear direction and up and down in the vehicle body up-and-down direction.

Figure 1:
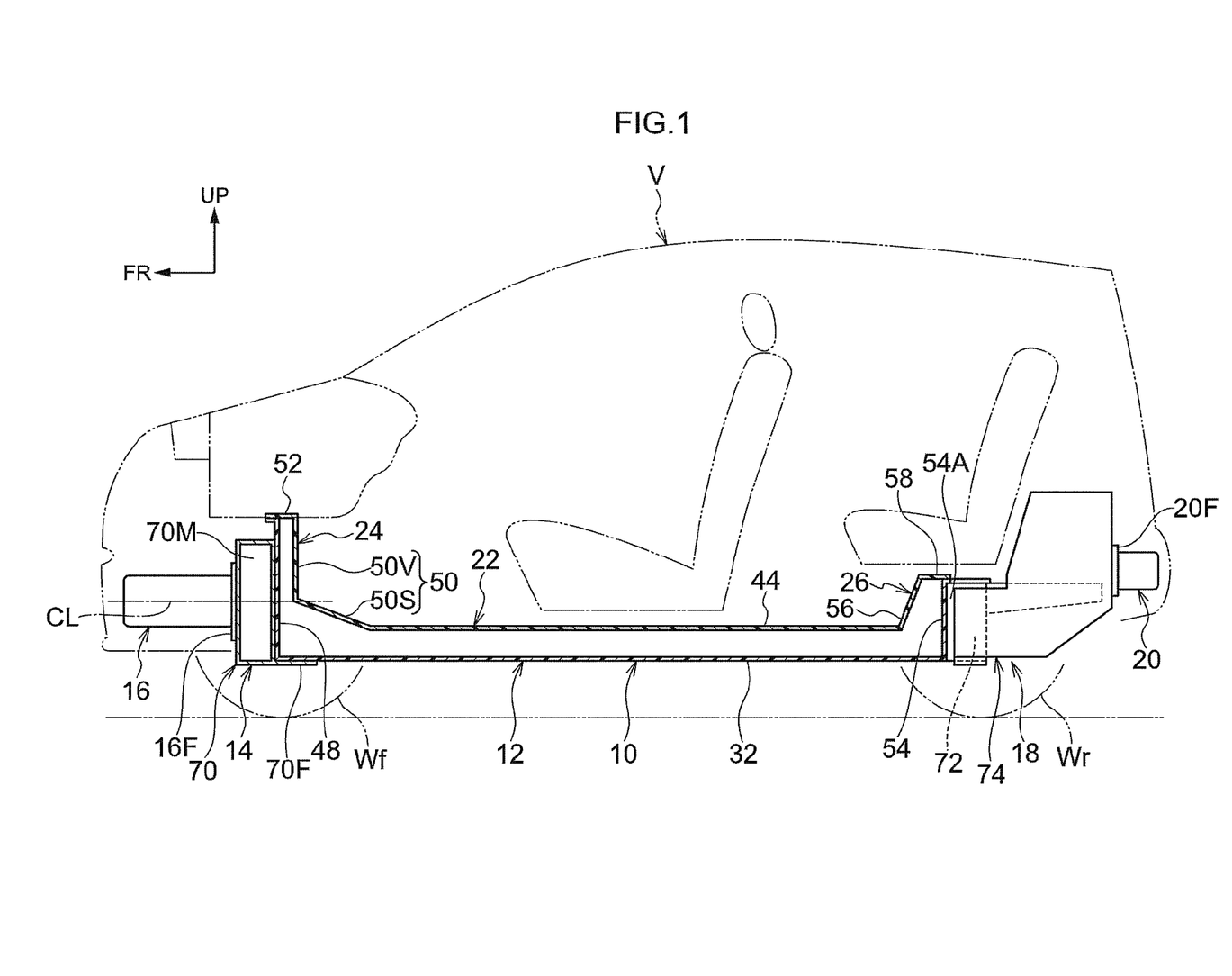
FIG. 1 is a schematic side sectional diagram showing an vehicle that includes a resin body structure in accordance with a present exemplary embodiment.
Figure 2:
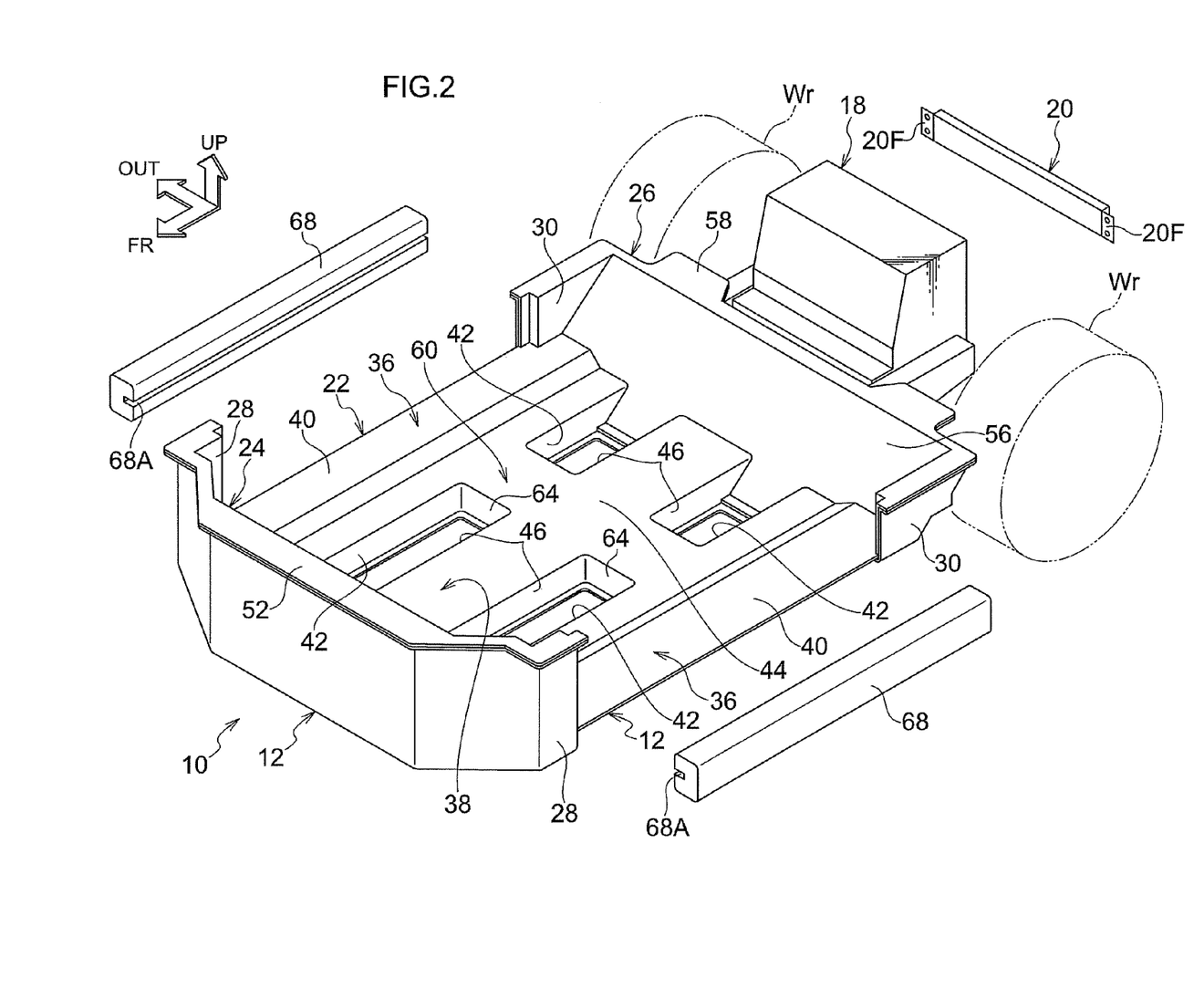
FIG. 2 is a perspective diagram showing a lower portion side of the vehicle that includes the resin body structure in accordance with the present exemplary embodiment.
Figure 4:
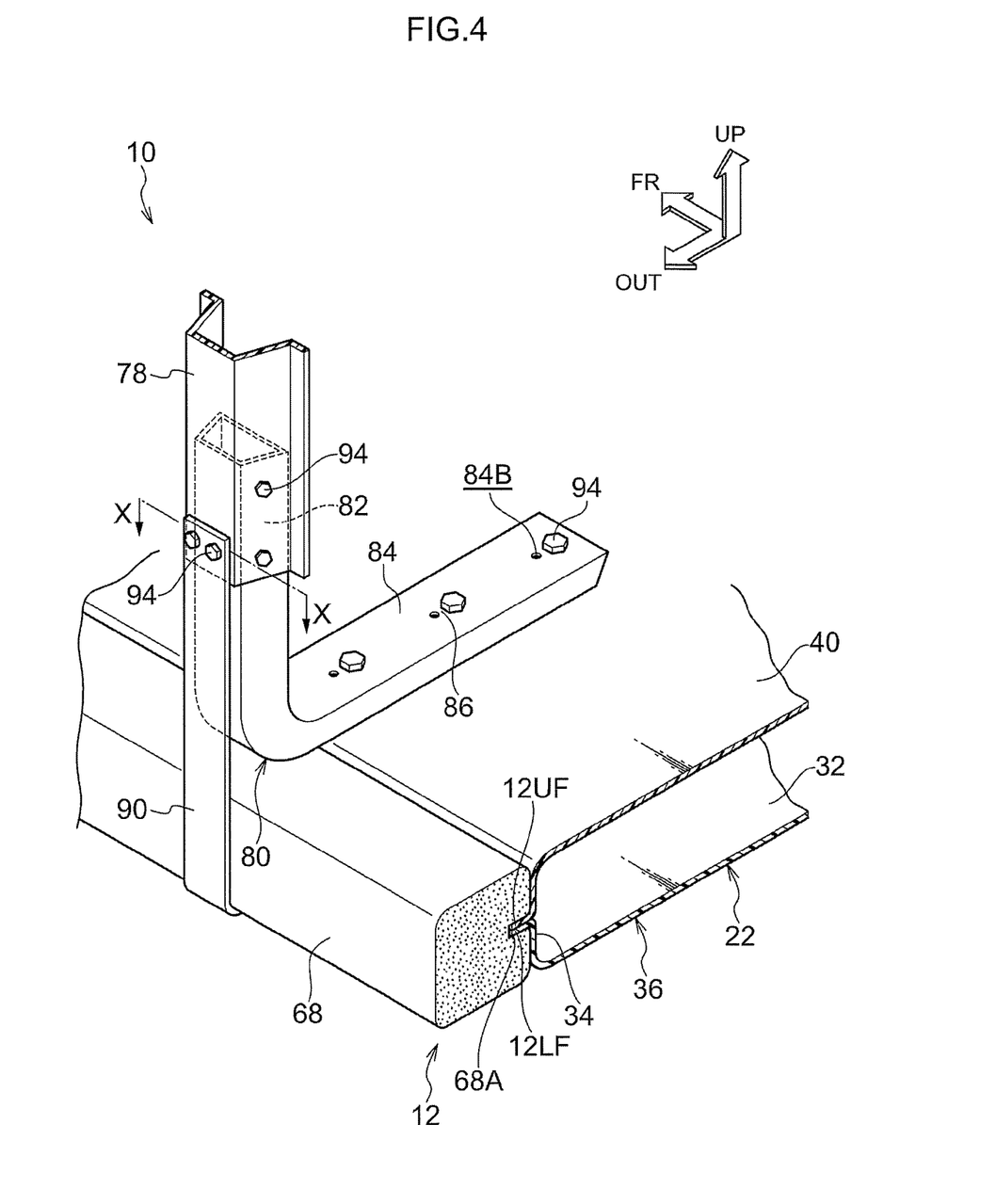
FIG. 4 is a perspective diagram showing a vehicle body structure in accordance with the present exemplary embodiment.

As shown in FIG. 1, a resin body structure 10 that serves as a vehicle body structure in accordance with the present exemplary embodiment is employed in an (electric) vehicle V that serves as a vehicle. As shown in FIG. 1, FIG. 2 and FIG. 4, the resin body structure 10 is a structure whose principal portions are an underbody 12, a front suspension module 14, a front energy absorber 16, a rear suspension module 18, a rear energy absorber 20, side energy absorbers 68, and center pillars 78.

—Structure of Underbody—

The underbody 12, which is fabricated of resin, is a structure that includes a floor portion 22, a dash lower portion 24 and a lower back portion 26. The floor portion 22 has a substantially rectangular shape in a plan view. The dash lower portion 24 is provided standing upward from the front end of the floor portion 22. The lower back portion 26 is provided standing upward from the rear end of the floor portion 22. The dash lower portion 24 and the lower back portion 26 have lengths that substantially span the whole width of the floor portion 22, and are formed in substantially rectangular shapes whose length directions are oriented in the vehicle width direction in elevational views.

Figure 3:
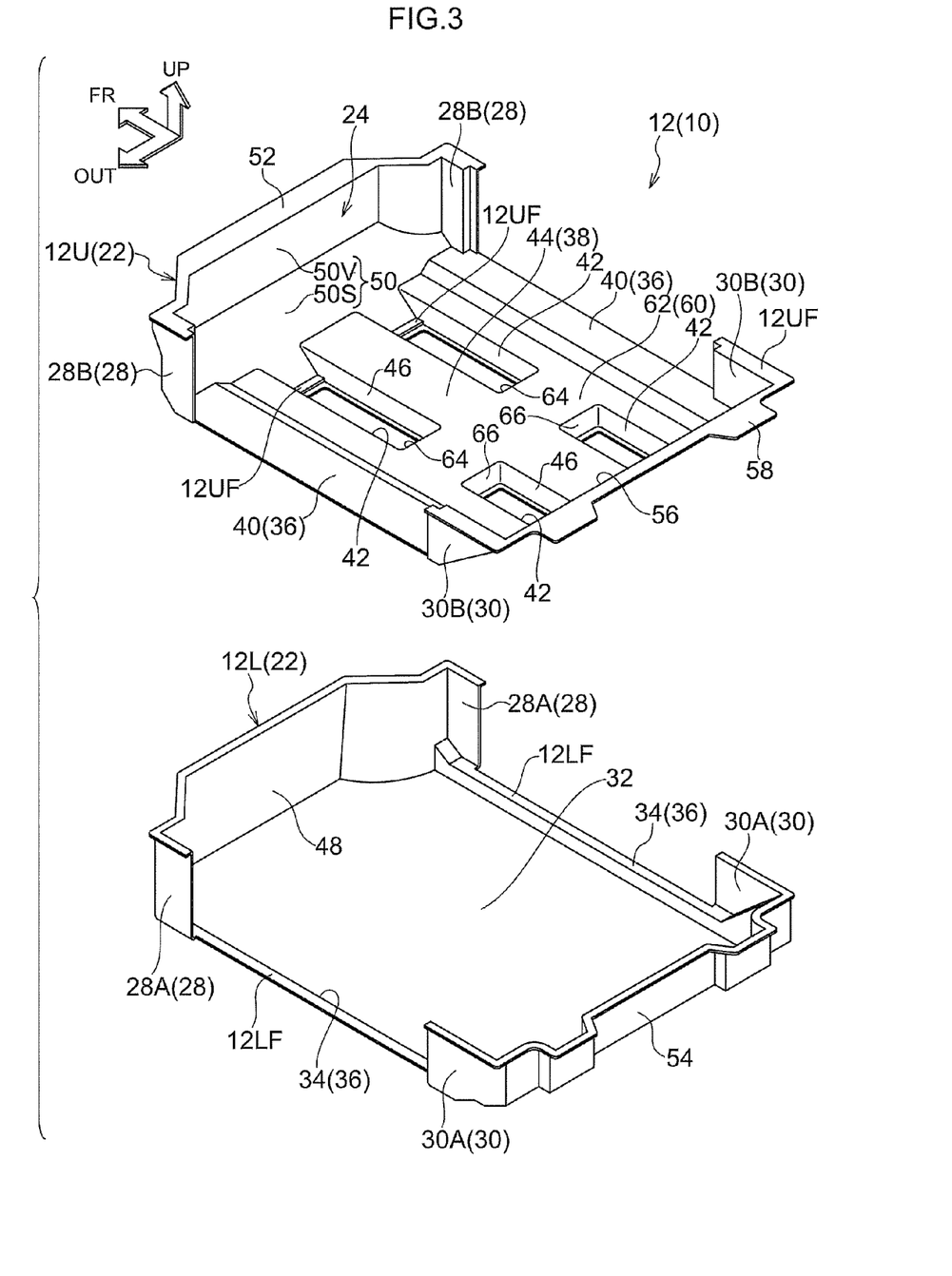
FIG. 3 is a perspective diagram showing the structure of a floor portion of the resin body structure in accordance with the present exemplary embodiment.

As shown in FIG. 2 and FIG. 3, front sidewalls 28 are provided extending rearward from each of the two vehicle width direction ends of the dash lower portion 24, and rear sidewalls 30 are provided extending forward from each of the two vehicle width direction ends of the lower back portion 26. Lower ends of the front sidewalls 28 and the rear sidewalls 30 are continuous with respective vehicle width direction outer end portions of the floor portion 22 (rockers 36, which are described below), and the front sidewalls 28 and rear sidewalls 30 are spaced apart from one another in the front-and-rear direction. According to the above, the underbody 12 as a whole is formed in a bathtub shape (i.e., a bathtub shape in which portions of the side walls are cut away).

As shown in FIG. 1 and FIG. 3, the floor portion 22 includes a lower wall 32 that is substantially flat in the horizontal plane. Outer sidewalls 34 are provided standing upward from each of the two vehicle width direction sides of the lower wall 32. A left and right pair of the rockers 36 and a center framework formation portion 38 are provided to serve as a framework structure at the vehicle upward side of the lower wall 32. Length directions of each of the rockers 36 and the center framework formation portion 38 are oriented in the front-and-rear direction.

Each of the left and right rockers 36 has a closed cross section structure, with a rectangular frame shape in a front sectional view. Each rocker 36 is structured by the lower wall 32, an upper wall 40 that opposes the lower wall 32 in the up-and-down direction, the outer sidewall 34, and an inner sidewall 42 that opposes the outer sidewall 34 in the vehicle width direction. The center framework formation portion 38 has a closed cross section structure, with a rectangular frame shape in a front sectional view. The center framework formation portion 38 is structured by the lower wall 32, an upper wall 44 that opposes the lower wall 32 in the up-and-down direction, and a pair of center sidewalls 46 that oppose one another.

In the present exemplary embodiment, the upper walls 40 and the upper wall 44 are structured so as to oppose the lower wall 32 with different spacings therefrom. That is, the left and right rockers 36 are structured so as to be taller than the center framework formation portion 38.

As shown in FIG. 1 to FIG. 3, the dash lower portion 24 has a closed cross section structure and spans between front end portions of the left and right rockers 36 and the center framework formation portion 38. Similarly, the lower back portion 26 has a closed cross section structure and spans between rear end portions of the left and right rockers 36 and the center framework formation portion 38.

Specifically, the structure of the dash lower portion 24 includes a front wall 48 and rear wall 50 that oppose one another in the front-and-rear direction, and an upper wall 52 that opposes the lower wall 32. That is, the dash lower portion 24 is formed with a closed cross section structure by the lower wall 32, the front wall 48, the rear wall 50 and the upper wall 52. In the present exemplary embodiment, a lower portion of the rear wall 50 structuring the dash lower portion 24 is an inclined wall 50S.

The inclined wall 50S is inclined relative to the front-and-rear direction (horizontal direction) such that the rear end side thereof is disposed lower than the front end side thereof. The front upper end is continuous with a lower end of a vertical wall 50V of the rear wall 50, which is substantially along the up-and-down direction. A position of the front upper end of the inclined wall 50S (of the boundary portion with the vertical wall 50V) in the up-and-down direction substantially coincides with a position in the up-and-down direction of a center line CL of the front energy absorber 16 (a line passing through the middle thereof in the drawings).

At portions of the floor portion 22 at which the rockers 36 and the center framework formation portion 38 are formed, the rear lower end of the inclined wall 50S is continuous with the upper walls 40 and 44 opposing the lower wall 32. At portions of the floor portion 22 at which the rockers 36 and the center framework formation portion 38 are not formed, the rear lower end of the inclined wall 50S is continuous with upper flanges 12UF (described below) that are joined to the lower wall 32.

The structure of the lower back portion 26 includes a rear wall 54 and front wall 56 that oppose one another in the front-and-rear direction, and an upper wall 58 that opposes the lower wall 32. That is, the lower back portion 26 is formed with a closed cross section structure by the lower wall 32, the rear wall 54, the front wall 56 and the upper wall 58. The front wall 56 is inclined as a whole relative to the front-and-rear direction (the horizontal direction) such that the front end side thereof is disposed lower than the rear end side thereof.

The floor portion 22 includes a central cross portion 60 that spans between the left and right rockers 36 and the center framework formation portion 38 at substantially central portions thereof in the front-and-rear direction. The central cross portion 60 has a closed cross section structure, with a rectangular frame shape in a side sectional view. The central cross portion 60 is structured by the lower wall 32, an upper wall 62 that opposes the lower wall 32 in the up-and-down direction, and a front wall 64 and rear wall 66 that oppose one another in the front-and-rear direction.

The underbody 12 described above is structured with a resin material. The resin material constituting the underbody 12 may be, for example, a fiber-reinforced resin containing reinforcing fibers such as carbon fibers, glass fibers, aramid fibers or the like.

The underbody 12 (the floor portion 22) is structured by a lower panel 12L and an upper panel 12U being superposed in the up-and-down direction and joined. Specifically, as shown in FIG. 3, the structure of the lower panel 12L includes the lower wall 32, the outer sidewalls 34, the front wall 48 of the dash lower portion 24, the rear wall 54 of the lower back portion 26, an outer wall 28A of each front sidewall 28, an outer wall 30A of each rear sidewall 30, and lower flanges 12LF that are projected outward from periphery edge portions in a plan view.

Meanwhile, the structure of the upper panel 12U includes the upper wall 40 and inner sidewall 42 (framework formation portions) of each rocker 36, the upper wall 44 and pair of center sidewalls 46 (framework formation portions) of the center framework formation portion 38, the rear wall 50 (the vertical wall 50V and the inclined wall 50S) and upper wall 52 of the dash lower portion 24, the front wall 56 and upper wall 58 of the lower back portion 26, the upper wall 62, front wall 64 and rear wall 66 of the central cross portion 60, an inner wall 28B of each front sidewall 28, an inner wall 30B of each rear sidewall 30, and upper flanges 12UF that are projected outward from periphery edge portions in a plan view.

The upper flanges 12UF are also formed at respective lower ends of each inner sidewall 42, each center sidewall 46, the inclined wall 50S (at portions at which the rockers 36 and the center framework formation portion 38 are not formed), the front wall 56 (at portions at which the rockers 36 and the center framework formation portion 38 are not formed), the front wall 64 and the rear wall 66.

The lower panel 12L and upper panel 12U of the underbody 12 are fixed together by the lower flanges 12LF and upper flanges 12UF being adhered together and by the above-mentioned upper flanges 12UF formed at the respective lower ends being adhered together with the lower wall 32. Thus, the underbody 12 structures the closed cross section structures mentioned above. Each front sidewall 28 is structured with a closed cross section structure by the outer wall 28A and the inner wall 28B, and each rear sidewall 30 is structured with a closed cross section structure by the outer wall 30A and the inner wall 30B.

—Structures of Suspension Modules—

As shown in FIG. 1, the structure of the front suspension module 14 includes at least a suspension member 70 and a pair of left and right front suspensions that are not shown in the drawings. A length direction of the suspension member 70 is aligned with the vehicle width direction, and the suspension member 70 has a closed cross section structure in the side sectional view of FIG. 1.

The left and right front suspensions are wholly mounted at the suspension member 70, and front wheels Wf (see FIG. 1) are steerably supported by the suspension member 70 via the front suspensions. That is, the front suspensions are supported at the suspension member 70 so as to function independently without depending on other portions of the structure of the vehicle body of the vehicle V.

The structure of the rear suspension module 18 includes at least a suspension member 74 and a pair of left and right rear suspensions that are not shown in the drawings. The left and right rear suspensions are wholly mounted at the suspension member 74, and rear wheels Wr are turnably supported by the suspension member 74 via the rear suspensions. That is, the rear suspensions are supported at the suspension member 74 so as to function independently without depending on other portions of the structure of the vehicle body of the vehicle V.

Wheel hub motors are incorporated in the rear wheels Wr. A power control unit (PCU) for driving the wheel hub motors is mounted at the rear suspension module 18. The PCU is a battery and control device that are not shown in the drawings. Thus, the rear suspension module 18 may be understood as being a driving unit for the vehicle V.

As shown in FIG. 1, the front suspension member 70 is fixed by fastening to the dash lower portion 24, and is fixed by fastening to the lower wall 32. Specifically, a main body portion 70M of the suspension member 70 is fastened and fixed to the front wall 48 of the dash lower portion 24 at plural locations in the vehicle width direction. A flange 70F is provided extending rearward from a lower rear end corner portion of the main body portion 70M. In a state in which the flange 70F is superposed with the lower face of the lower wall 32, the flange 70F is fastened and fixed to the lower wall 32 (i.e., the portion of the lower wall 32 that structures the dash lower portion 24) at plural locations in the vehicle width direction.

The rear suspension member 74 is fixed by fastening to the lower back portion 26. Specifically, the suspension member 74 is fastened and fixed, via a joining plate 72, to an inclined wall 54A. The inclined wall 54A is formed integrally with the rear wall 54 of the lower back portion 26 so as to project to the vehicle rearward side thereof.

—Structures of Energy Absorbers—

As shown in FIG. 1, the front energy absorber 16 is formed in a box shape (a substantially rectangular box shape) with a length in the vehicle width direction that is substantially equal to the length of the suspension member 70 in the vehicle width direction (a spacing between the left and right front suspensions). The front energy absorber 16 is fastened and fixed to the suspension member 70 at a flange 16F that is projected from the rear end of the front energy absorber 16.

As shown in FIG. 1 and FIG. 2, the rear energy absorber 20 is formed in a box shape (a substantially rectangular box shape) with a length in the vehicle width direction that is substantially equal to the length of the suspension member 74 in the vehicle width direction (a spacing between the left and right rear suspensions). The rear energy absorber 20 is fastened and fixed to the suspension member 74 at flanges 20F that are projected from the two vehicle width direction ends of the rear energy absorber 20.

As shown in FIG. 2 and FIG. 4, each side energy absorber 68 is formed in a box shape (a substantially rectangular box shape) with a length in the vehicle front-and-rear direction that is substantially equal to the length in the vehicle front-and-rear direction of the rocker 36 (the spacing between the front sidewall 28 and the rear sidewall 30). A slit portion 68A is formed so as to extend in the vehicle front-and-rear direction at a substantially central portion of the side energy absorber 68 in the up-and-down direction, at the vehicle width direction inner side of the side energy absorber 68. The side energy absorber 68 is fixed to the rocker 36 by the slit portion 68A being adhered to the upper flange 12UF and lower flange 12LF of the rocker 36 so as to retain these flanges from above and below.

The respective portions of the front energy absorber 16, rear energy absorber 20 and side energy absorbers 68 described above are integrally formed of resin material. The resin materials constituting the front energy absorber 16, rear energy absorber 20 and side energy absorbers 68 may be, for example, a fiber-reinforced resin containing reinforcing fibers such as carbon fibers, glass fibers, aramid fibers or the like. The front energy absorber 16, rear energy absorber 20 and side energy absorbers 68 may also be constituted of a metal material, such as aluminium or an alloy thereof, or the like.

—Joining Structure between Center Pillar and Floor Portion—

As illustrated in FIG. 4, each center pillar 78 of the vehicle V is fabricated of resin. That is, the center pillar 78 is formed of, for example, a fiber-reinforced resin containing reinforcing fibers such as carbon fibers, glass fibers, aramid fibers or the like. Front pillars and rear pillars that are not shown in the drawings are also fabricated of resin. In the present exemplary embodiment, however, only the center pillars 78 are described.

Figure 5:
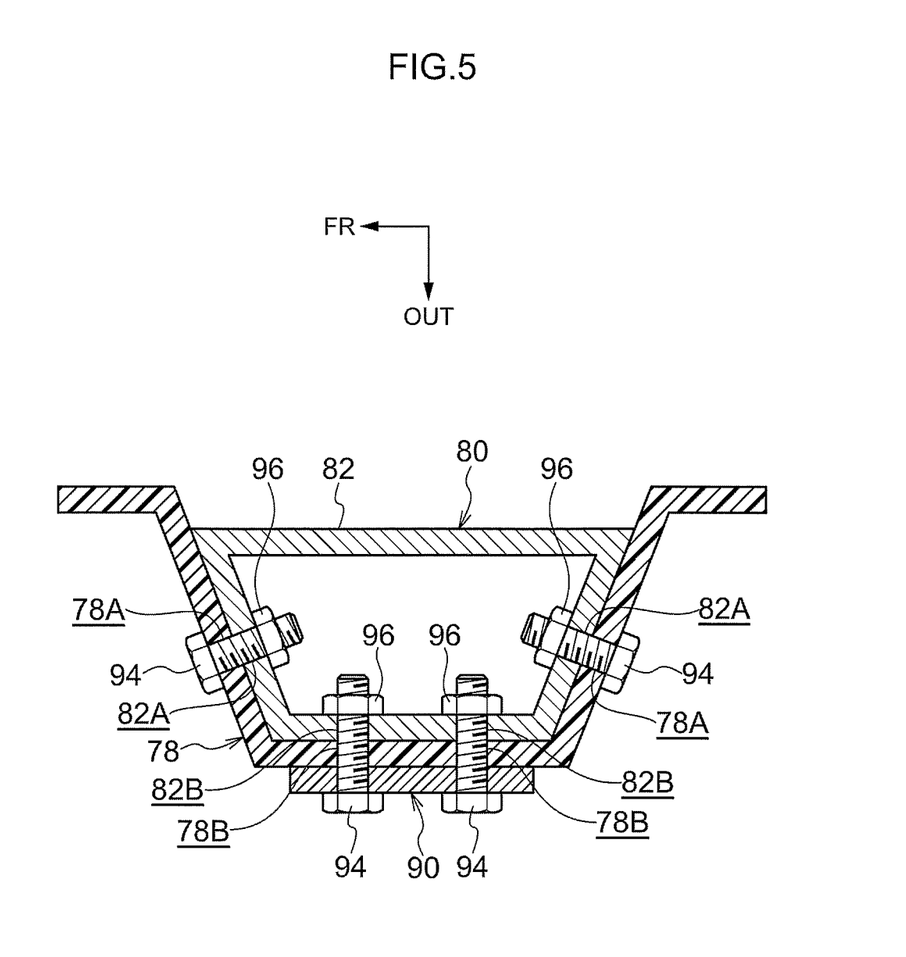
FIG. 5 is a sectional diagram taken along line X-X of FIG. 4.
Figure 6:
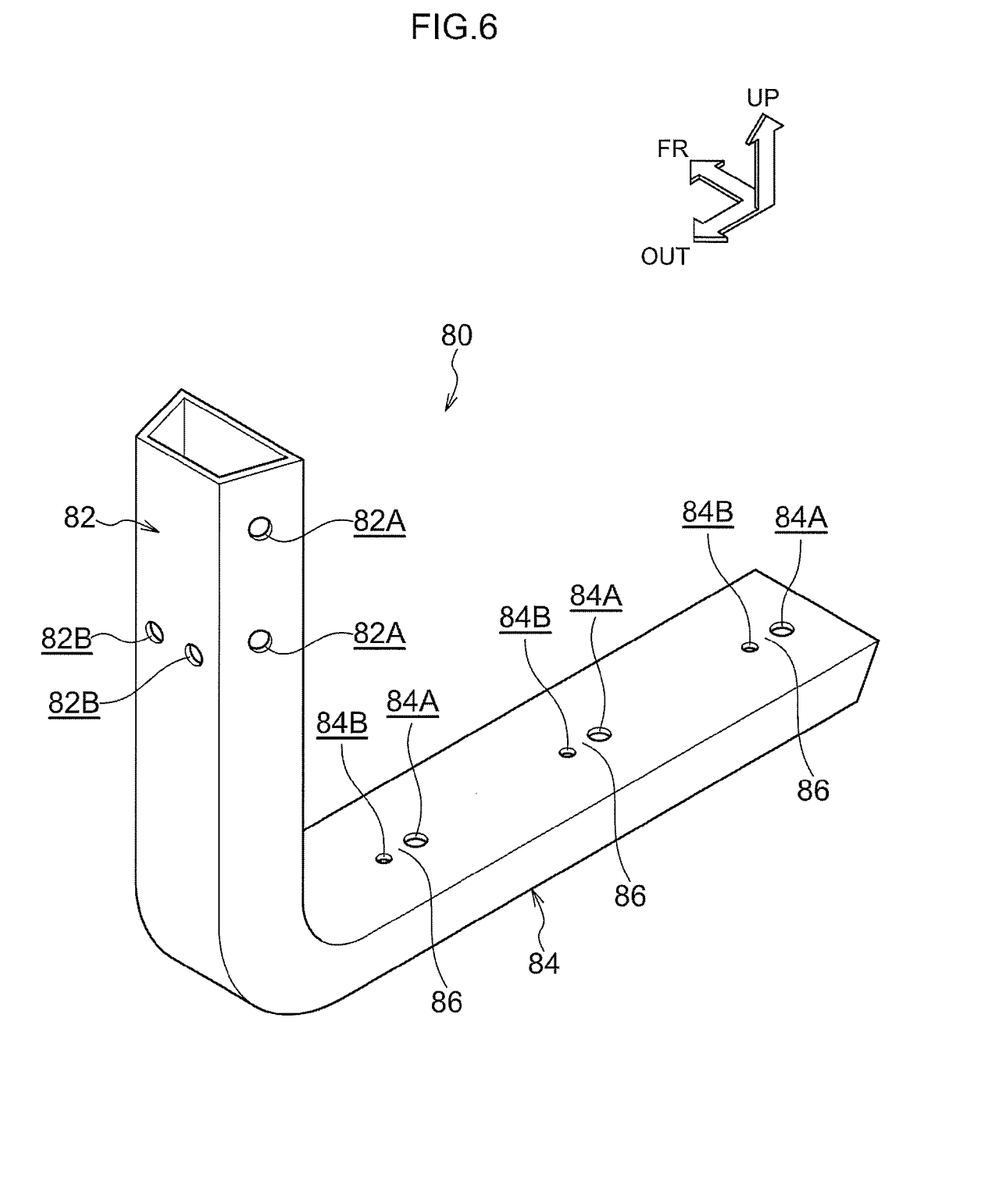
FIG. 6 is a perspective diagram showing a connecting member in accordance with the present exemplary embodiment.
Figure 7:
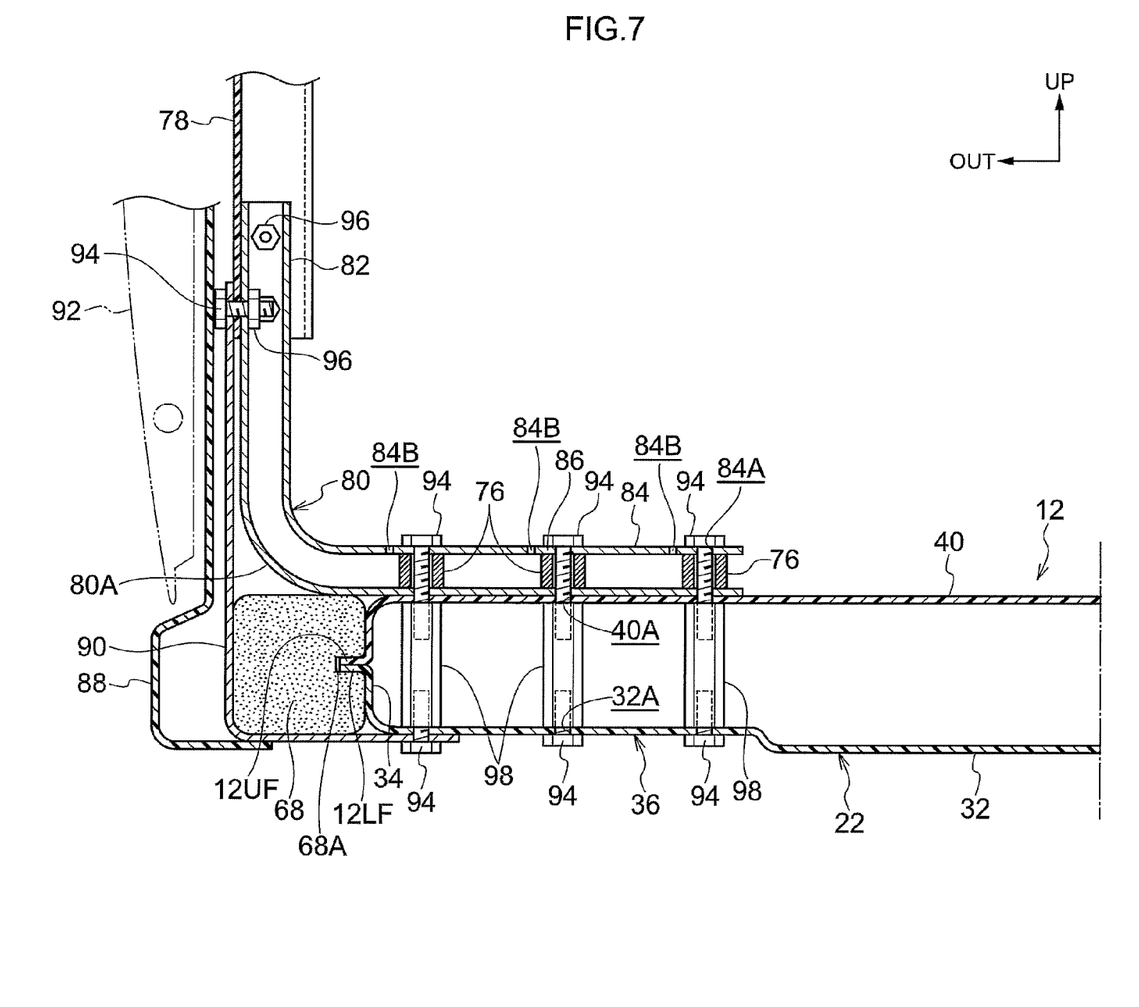
FIG. 7 is a side sectional diagram showing the vehicle body structure in accordance with the present exemplary embodiment before a side collision.

As shown in FIG. 5, each center pillar 78 is formed substantially in a hat shape in a cross section taken in the horizontal direction. The center pillar 78 is connected (joined) to the floor portion 22 of the underbody 12 by a connecting member 80. The connecting member 80 is constituted of a metal material with high ductility such as aluminium or an alloy thereof, or the like. As shown in FIG. 6 and FIG. 7, the connecting member 80 is formed in a pris tube shape (a closed cross section shape) that is inflected in a substantial "L" shape in an elevational view (i.e., includes an inflection portion 80A that is inflected through approximately 90°).

More specifically, as shown in FIG. 5, the external cross-sectional shape of the connecting member 80 is formed in an isosceles trapezoid shape in plan view, which runs along the shape of inner wall faces of the center pillar 78 such that a pillar-fastening portion 82, which is an upper end portion side of the connecting member 80, fits into the center pillar 78. As shown in FIG. 4 to FIG. 6, bolt insertion holes 82A are formed in the front wall and rear wall of the pillar-fastening portion 82, which are angled relative to the vehicle width direction, and bolt insertion holes 78A are formed in the front wall and rear wall of the center pillar 78, which are angled relative to the vehicle width direction.

Hence, the bolt insertion holes 82A and bolt insertion holes 78A are put into communication, bolts 94 are inserted through the communicated bolt insertion holes 78A and 82A, and the bolts 94 are screwed into weld nuts 96 provided inside the connecting member 80. Thus, the pillar-fastening portion 82 of the connecting member 80 is fastened and fixed to the lower end portion side of the center pillar 78. Here, two each of the bolt insertion holes 78A and 82A are provided, above and below, in each of the front walls and rear walls.

A floor-fastening portion 84, which is the lower end portion side of the connecting member 80, is fastened and fixed to the upper wall 40 structuring the rocker 36 of the floor portion 22 by plural numbers of the bolts 94 and long nuts 98. More specifically, as shown in FIG. 7, the long nuts 98 are arranged along the vehicle width direction (the length direction of the floor-fastening portion 84) between the lower wall 32 and upper wall 40 structuring the rocker 36, and the long nuts 98 are fixed to the lower wall 32 by others of the bolts 94.

That is, bolt insertion holes 40A and 32A are formed coaxially in the upper wall 40 and the lower wall 32, and the length of the long nuts 98 is equal to the spacing between the lower wall 32 and the upper wall 40. Hence, the bolts 94 inserted through the bolt insertion holes 32A of the lower wall 32 are screwed into the lower portion sides of the long nuts 98. Thus, the long nuts 98 are fixed to the lower wall 32 in a state in which the bolt insertion holes 40A formed in the upper wall 40 may be put into communication with the long nuts 98.

As shown in FIG. 6 and FIG. 7, bolt insertion holes 84A are formed in the floor-fastening portion 84 in a plural number along the vehicle width direction (the length direction of the floor-fastening portion 84), and tubular collar members 76 are provided in the interior of the floor-fastening portion 84. The collar members 76 coaxially communicate with the bolt insertion holes 84A. Hence, the floor-fastening portion 84 is fixed to the floor portion 22 (the rocker 36) by others of the bolts 94 being inserted through the bolt insertion holes 84A (and the collar members 76) and the bolt insertion holes 40A, and screwed into the upper portion sides of the long nuts 98.

The collar members 76 are merely disposed inside the connecting member 80 and are not particularly fixed. As shown in FIG. 6, penetrating holes 84B are formed at portions of the floor-fastening portion 84 adjacent to the vehicle width direction outer sides of the bolt insertion holes 84A. The penetrating holes 84B have internal diameters the same as or smaller than the internal diameters of the bolt insertion holes 84A, and serve as load regulation apertures. Thus, a structure is formed in which portions between the bolt insertion holes 84A and the penetrating holes 84B may serve as weakened portions 86 that may be ruptured by the bolts 94 at the time of a side collision.

As shown in FIG. 4 and FIG. 7, a strip-shaped tension member 90 is provided in a tensioned state (provided in a state with a pre-specified tension force) between a lower end portion of the center pillar 78 and the lower wall 32 structuring the rocker 36, so as to wrap around the side energy absorber 68 (i.e., so as to pass along the vehicle width direction outer side of the side energy absorber 68).

The tension member 90 is structured by a resilient body of rubber or the like. As shown in FIG. 5, an upper end portion of the tension member 90 is fastened and fixed to the center pillar 78 and the connecting member 80 by others of the bolts 94 and the weld nuts 96. That is, bolt insertion holes 78B and 82B are formed in the center pillar 78 and the connecting member 80, respectively, and the bolts 94 are inserted through the bolt insertion holes 78B and 82B in order to attach the tension member 90.

As shown in FIG. 7, a lower end portion of the tension member 90 is fastened and fixed to the lower wall 32 by the bolt 94 that is screwed into the long nut 98 that is at the vehicle width direction outermost side. The tension member 90 is formed with a width substantially the same as the width of the connecting member 80. Further, as shown in FIG. 7, an outer panel 88 and a door 92 that structure the exterior of the vehicle are provided at the vehicle width direction outer side of the tension member 90.

Operation of the resin body structure 10 with the above structure is described next.

In the (electric) vehicle V in which the resin body structure 10 according to the present exemplary embodiment is employed, the wheel hub motors in the rear wheels Wr are supplied with electrical power from the PCU incorporated in the suspension member 74, and the vehicle runs due to the driving force of the wheel hub motors. The front wheels Wf that are supported via the front suspensions steer in accordance with steering of a steering wheel in the vehicle V.

In the vehicle V, when a front collision occurs, an impact load is inputted to the front energy absorber 16. The front energy absorber 16 is compressively deformed by this impact load, absorbing impact energy (a dynamic load) and transmitting a load (a support reaction force) to the suspension member 70. At this time, the impact load inputted to the front energy absorber 16 is taken up over a large area of the suspension member 70 (a wall that is long in the vehicle width direction), and the front energy absorber 16 is compressively deformed in a stable manner.

Thus, the impact load is efficiently absorbed by the front energy absorber 16. An impact load that is not completely absorbed by the front energy absorber 16 but transmitted to the suspension member 70 is transmitted to the floor portion 22 via the dash lower portion 24, and is absorbed by the floor portion 22.

That is, because the position in the up-and-down direction of the front upper end of the inclined wall 50S substantially coincides with the position in the up-and-down direction of the center line CL of the front energy absorber 16 in side view, the load that is inputted from the front energy absorber 16 to the dash lower portion 24 is efficiently transmitted to the rockers 36 and center framework formation portion 38 of the floor portion 22. That is, this impact load (i.e., a moment acting to tilt the dash lower portion 24 rearward) is efficiently transmitted to the rockers 36 and the center framework formation portion 38 in the form of an axial force on the inclined wall 50S.

In the vehicle V, when a rear collision occurs, an impact load is inputted to the rear energy absorber 20. The rear energy absorber 20 is compressively deformed by this impact load, absorbing impact energy (a dynamic load) and transmitting a load (a support reaction force) to the suspension member 74. At this time, the impact load inputted to the rear energy absorber 20 is taken up over a large area of the suspension member 74 (a wall that is long in the vehicle width direction), and the rear energy absorber 20 is compressively deformed in a stable manner.

Thus, the impact load is efficiently absorbed by the rear energy absorber 20. An impact load that is not completely absorbed by the rear energy absorber 20 but transmitted to the suspension member 74 is transmitted to the floor portion 22 via the lower back portion 26, and is absorbed by the floor portion 22.

Figure 8:
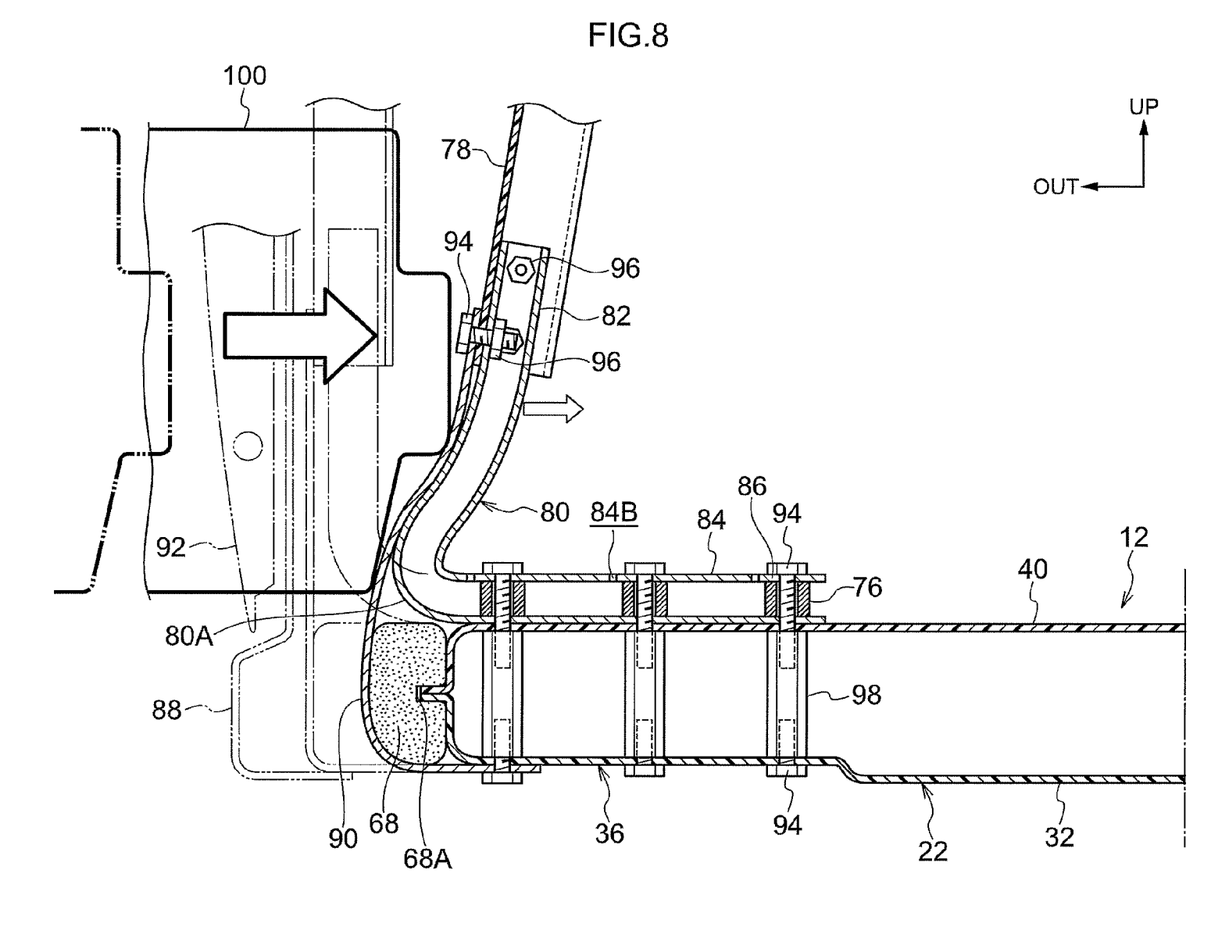
FIG. 8 is a side sectional diagram showing the vehicle body structure in accordance with the present exemplary embodiment after the side collision.

In the vehicle V, when a side collision is caused by an impacting vehicle 100, as illustrated in FIG. 8, the door 92 and the outer panel 88 are pushed and move to the vehicle width direction inner side. Correspondingly, the center pillar 78 and the pillar-fastening portion 82 side of the connecting member 80—more specifically the vehicle body upward side of the connecting member 80 relative to the inflection portion 80A—are plastically deformed to the vehicle width direction inner side by the impact energy (impact load) that is inputted by the side collision.

Here, because the connecting member 80 is fabricated of a metal with a higher ductility than the center pillar 78 fabricated of resin and the floor portion 22 fabricated of resin, the impact load at the time of the side collision may be absorbed (moderated) to some extent by the plastic deformation of the connecting member 80. Thus, the withstand load strength of the joining portion between the center pillar 78 and the floor portion 22 (i.e., the connecting member 80) may be assured. Consequently, rupturing (breakage) of the center pillar 78 and the floor portion 22) may be prevented.

Meanwhile, the upper end portion side of the tension member 90 moves to the vehicle width direction inner side in accordance with the deformation of the connecting member 80. Correspondingly, because the side energy absorber 68 is supported at (fixed to) the vehicle width direction outer side end face of the rocker 36, the tension member 90 crushes (compressively deforms) the side energy absorber 68 while moving. Therefore, the impact load may be absorbed by the side energy absorber 68 more efficiently than in a structure in which the tension member 90 is not provided.

Moreover, when the upper end portion side of the tension member 90 moves to the vehicle width direction inner side, the center pillar 78 is pulled toward the vehicle width direction outer side by a resilient restoring force of the tension member 90. Therefore, movement of the center pillar 78 to the vehicle width direction inner side (bending deformation of the pillar-fastening portion 82 side of the connecting member 80 about the inflection portion 80A) may be suppressed, and deformation of the vehicle cabin may be suppressed.

Figure 9:
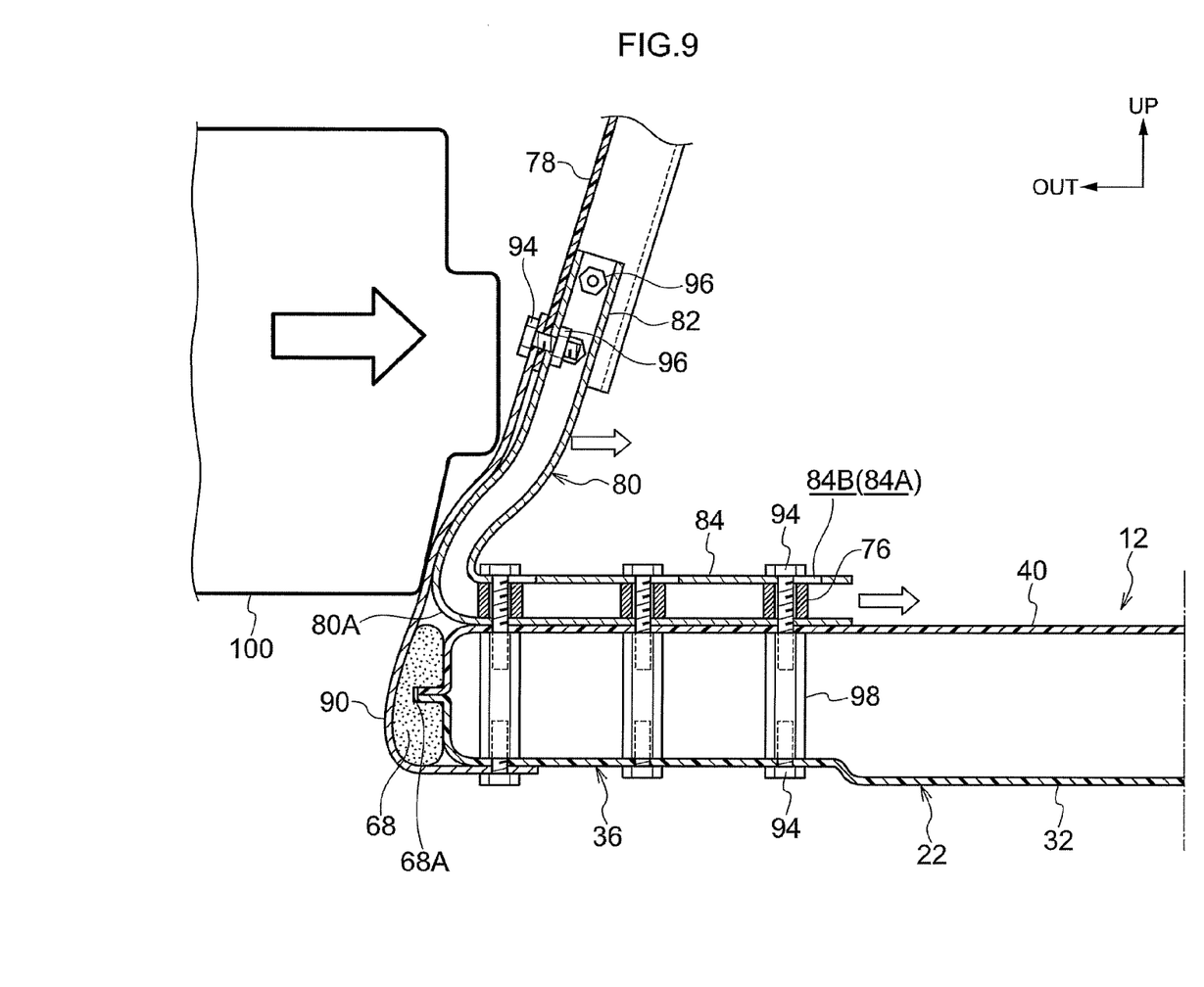
FIG. 9 is a side sectional diagram showing the vehicle body structure in accordance with the present exemplary embodiment after the side collision.

If an impact load that is not completely absorbed by the plastic deformation of the connecting member 80 and the compressive deformation of the side energy absorber 68 is inputted, the connecting member 80 is pushed further to the vehicle width direction inner side. Correspondingly, as shown in FIG. 9, because the collar members 76 are not fixed to the connecting member 80, the weakened portions 86 are ruptured by being pushed to the vehicle width direction outer side relative to the bolts 94, and the floor-fastening portion 84 of the connecting member 80 slides (is translated) to the vehicle width direction inner side (until the bolts 94 are disposed in the penetrating holes 84B).

Therefore, the impact load may be further absorbed (moderated). Accordingly, the withstand load strength of the joining portion between the center pillar 78 and the floor portion 22 (i.e., the connecting member 80) may be further assured, and rupturing (breakage) of the center pillar 78 and the floor portion 22 may be further prevented.

An impact load that is not completely absorbed even by the structures described above is transmitted to and absorbed by the rocker 36 (the floor portion 22). Therefore, deformation of the underbody 12 at the time of a side collision may be suppressed or prevented. In other words, deformation of the vehicle cabin at the time of a side collision may be suppressed or prevented.

Thus, even though the underbody 12 is fabricated of resin, as described above, the connecting member 80 that is the joining portion between the center pillar 78 and the floor portion 22 may be caused to function as an energy absorption member at the time of a side collision. Consequently, a reduction in weight of the vehicle V may be achieved.

Hereabove, the vehicle body structure (the resin body structure 10) according to the present exemplary embodiment is described on the basis of the attached drawings, but the vehicle body structure according to the present exemplary embodiment is not limited to the vehicle body structure shown in the drawings; designs may be modified as appropriate within a scope not departing from the spirit of the present invention. For example, the upper panel 12U and lower panel 12L may be joined by fusing or welding. Further, a structure is possible in which the pillar-fastening portion 82 of the connecting member 80 is joined to the center pillar 78 by an adhesive.

The invention claimed is:

1. A vehicle body structure comprising:
   a floor fabricated of resin that is disposed at a vehicle body lower side;
   a pillar fabricated of resin that is disposed so as to extend in a vehicle body up-and-down direction at a vehicle width direction outer side of the floor;
   a connecting member that connects the pillar with the floor, the connecting member being constituted of a material with higher ductility than the pillar and the floor
   wherein a lower end portion side of the connecting member serves as a floor-fastening portion that extends in a vehicle width direction and is fastened by a bolt to the floor, and
   wherein the floor-fastening portion includes a weakened portion that is ruptured by the bolt when a load is inputted to the floor-fastening portion from a vehicle width direction outer side and the floor-fastening portion is pushed to a vehicle width direction inner side.

2. The vehicle body structure according to claim 1, wherein the connecting member is constituted of a metal material.

3. The vehicle body structure according to claim 1, wherein the weakened portion is between a bolt insertion hole and a penetrating hole that is formed at a vehicle width direction outer side of the bolt insertion hole.

4. The vehicle body structure according to claim 1, further comprising:
   a tension member that is provided in a tensioned state between the pillar and the floor at a vehicle width direction outer side of the connecting member.

\* \* \* \* \*